United States Patent
Yang

(10) Patent No.: US 11,724,673 B2
(45) Date of Patent: Aug. 15, 2023

(54) AUTOMATIC EMERGENCY BRAKING USING A TIME-TO-COLLISION THRESHOLD BASED ON TARGET ACCELERATION

(71) Applicant: Aptiv Technologies Limited, St. Michael (BB)

(72) Inventor: Mingda Yang, Rochester Hills, MI (US)

(73) Assignee: Aptiv Technologies Limited, St. Michael (BB)

(*) Notice: Subject to any disclaimer, the term of this patent is extended or adjusted under 35 U.S.C. 154(b) by 213 days.

(21) Appl. No.: 17/158,617

(22) Filed: Jan. 26, 2021

(65) Prior Publication Data

US 2022/0234556 A1 Jul. 28, 2022

(51) Int. Cl.
*B60T 7/22* (2006.01)
*B60T 8/171* (2006.01)
(Continued)

(52) U.S. Cl.
CPC .............. *B60T 7/22* (2013.01); *B60T 8/171* (2013.01); *B60T 8/172* (2013.01); *B60T 8/3205* (2013.01);
(Continued)

(58) Field of Classification Search
CPC . B60T 7/22; B60T 8/171; B60T 8/172; B60T 8/3205; B60T 8/58;
(Continued)

(56) References Cited

U.S. PATENT DOCUMENTS

| 9,145,116 B2 | 9/2015 | Clarke et al. |
| 2005/0090955 A1* | 4/2005 | Engelman ............ G06V 20/58 180/271 |

(Continued)

FOREIGN PATENT DOCUMENTS

| CN | 112046454 A | 12/2020 |
| EP | 3539837 A1 | 9/2019 |

(Continued)

OTHER PUBLICATIONS

"Extended European Search Report", EP Application No. 21214783.9, dated Jun. 8, 2022, 7 pages.

*Primary Examiner* — Kenneth J Malkowski
*Assistant Examiner* — Andrew J Cromer
(74) *Attorney, Agent, or Firm* — Sawtooth Patent Group PLLC

(57) ABSTRACT

Techniques and systems are described that enable automatic emergency braking (AEB) using a time-to-collision (TTC) threshold that is based on target acceleration. The TTC may be a combination of a first TTC sub-threshold and a second TTC sub-threshold. The first TTC threshold may be based on a vehicle velocity of a host vehicle and a relative velocity between the host vehicle and a target object. The second TTC sub-threshold may be based on a target acceleration of the target object and a distance between the host vehicle and the target object. By utilizing the target acceleration in the TTC threshold determination, the techniques and systems described herein enable AEB to work as planned to prevent a collision between a vehicle and a target, in a wider variety of environments and situations.

20 Claims, 5 Drawing Sheets

(51) Int. Cl.
*B60T 8/172* (2006.01)
*B60T 8/32* (2006.01)
*B60T 8/58* (2006.01)

(52) U.S. Cl.
CPC ........... *B60T 8/58* (2013.01); *B60T 2201/022* (2013.01); *B60T 2210/32* (2013.01); *B60T 2250/00* (2013.01); *B60T 2250/04* (2013.01)

(58) Field of Classification Search
CPC ........... B60T 2201/022; B60T 2210/32; B60T 2250/00; B60T 2250/04
See application file for complete search history.

(56) References Cited

U.S. PATENT DOCUMENTS

| | | | |
|---|---|---|---|
| 2012/0101713 A1* | 4/2012 | Moshchuk | B60W 40/064 |
| | | | 701/301 |
| 2016/0244036 A1* | 8/2016 | Ike | B60T 8/3275 |
| 2017/0210360 A1 | 7/2017 | Ito et al. | |

FOREIGN PATENT DOCUMENTS

| | | |
|---|---|---|
| WO | 2011101014 | 8/2011 |
| WO | 2014040855 | 3/2014 |
| WO | 2020250019 A1 | 12/2020 |

* cited by examiner

400

402

| First TTC Sub-Thresholds 314 | | | | | |
|---|---|---|---|---|---|
| Vehicle Velocity | Relative Velocity | | | | |
| | 1 | 2 | 3 | 4 | ... |
| a | a1 | a2 | a3 | a4 | ... |
| b | b1 | b2 | b3 | b4 | ... |
| c | c1 | c2 | c3 | c4 | ... |
| d | d1 | d2 | d3 | d4 | ... |
| ... | ... | ... | ... | ... | ... |

+

| Second TTC Sub-Thresholds 316 | | | | | |
|---|---|---|---|---|---|
| Target Acceleration | Distance | | | | |
| | 5 | 6 | 7 | 8 | ... |
| e | e5 | e6 | e7 | e8 | ... |
| f | f5 | f6 | f7 | f8 | ... |
| g | g5 | g6 | g7 | g8 | ... |
| h | h5 | h6 | h7 | h8 | ... |
| ... | ... | ... | ... | ... | ... |

404

=

( TTC Threshold 310 )

Fig. 4

AUTOMATIC EMERGENCY BRAKING USING A TIME-TO-COLLISION THRESHOLD BASED ON TARGET ACCELERATION

BACKGROUND

Driver-assistance technologies are increasingly implemented in vehicles to increase safety. Automatic emergency braking (AEB) is one driver-assistance technology that enables vehicles to automatically slow to avoid collisions with other vehicles or objects. For example, a vehicle may determine that a collision with another vehicle is imminent and apply a braking force in an attempt to avoid the collision.

Traditional AEB systems are based on non-linear ideal braking profiles of the respective vehicles (e.g., maximum decelerations in ideal conditions). The non-linearity of the ideal braking profiles makes determining accurate time-to-collision (TTC) thresholds for activation of AEB systems difficult. Furthermore, actual braking performances of vehicles often deviate from their ideal braking profiles.

SUMMARY

Apparatuses and techniques enabling automatic emergency braking (AEB) using a time-to-collision (TTC) threshold based on target acceleration are described below. Some aspects described below include a method of AEB performed by a vehicle. The method determines, based on sensor data received from one or more sensors that are local to the vehicle, a target acceleration of a target object proximate to the vehicle. Based on the target acceleration, the method determines a TTC with the target object and a TTC threshold for the target object. The method further establishes that the TTC meets or is lower than the TTC threshold and causes a braking system of the vehicle to apply a braking force effective to avoid a collision with the target object.

Other aspects described below also include a system for performing AEB of a vehicle. The system comprises one or more sensors configured to produce sensor data indicating attributes of the vehicle and a target object proximate to the vehicle, a braking system configured to apply braking forces effective to slow the vehicle in conjunction with or in lieu of driver input, at least one processor, and at least one computer-readable storage medium comprising instructions that, when executed by the processor, cause the system to determine, based on the sensor data, a target acceleration of the target object. The instructions further cause the processor to determine, based on the target acceleration, a TTC with the target object and a TTC threshold for the target object. The instructions also cause the processor to establish that the TTC meets or is lower than the TTC threshold and cause, based on the establishment that the TTC has met or is lower than the TTC threshold, the braking system to apply a braking force effective to avoid a collision with the target object.

BRIEF DESCRIPTION OF THE DRAWINGS

Apparatuses and techniques enabling automatic emergency braking (AEB) using a time-to-collision (TTC) threshold based on target acceleration are described with reference to the following drawings. The same numbers are used throughout the drawings to reference like features and components:

FIG. 4 illustrates example look-up tables used to determine a TTC threshold based on target acceleration.

DETAILED DESCRIPTION

Overview

Automatic emergency braking (AEB) systems enable vehicles to determine that collisions with objects are imminent and provide braking forces in order to avoid the collisions. AEB systems generally calculate time-to-collision (TTC) estimates for targets and compare them with TTC thresholds to determine when to apply braking forces. Often times, however, these systems (or portions thereof) determine TTC thresholds based on ideal braking profiles and velocities of the vehicles and the targets. While these systems may work in many situations, there are situations where they may fail to apply braking forces soon enough to avoid a collision. For example, a system tuned for a moderate breaking of a front-traveling vehicle may be unable to stop when that front-traveling vehicle brakes aggressively. Accordingly, traditional AEB systems often produce non-optimal braking results in many situations.

Techniques and systems are described that enable AEB using a TTC threshold that is based on target acceleration. More specifically, the TTC threshold may be based on a vehicle velocity, a relative velocity between the vehicle and the target object, an acceleration of the target, and a distance between the vehicle and the target object. By accounting for target acceleration, the techniques and systems described herein are able to compensate for aggressive stopping of the target, thereby allowing AEB to function as planned in more situations.

Example Environment

Figure 1:
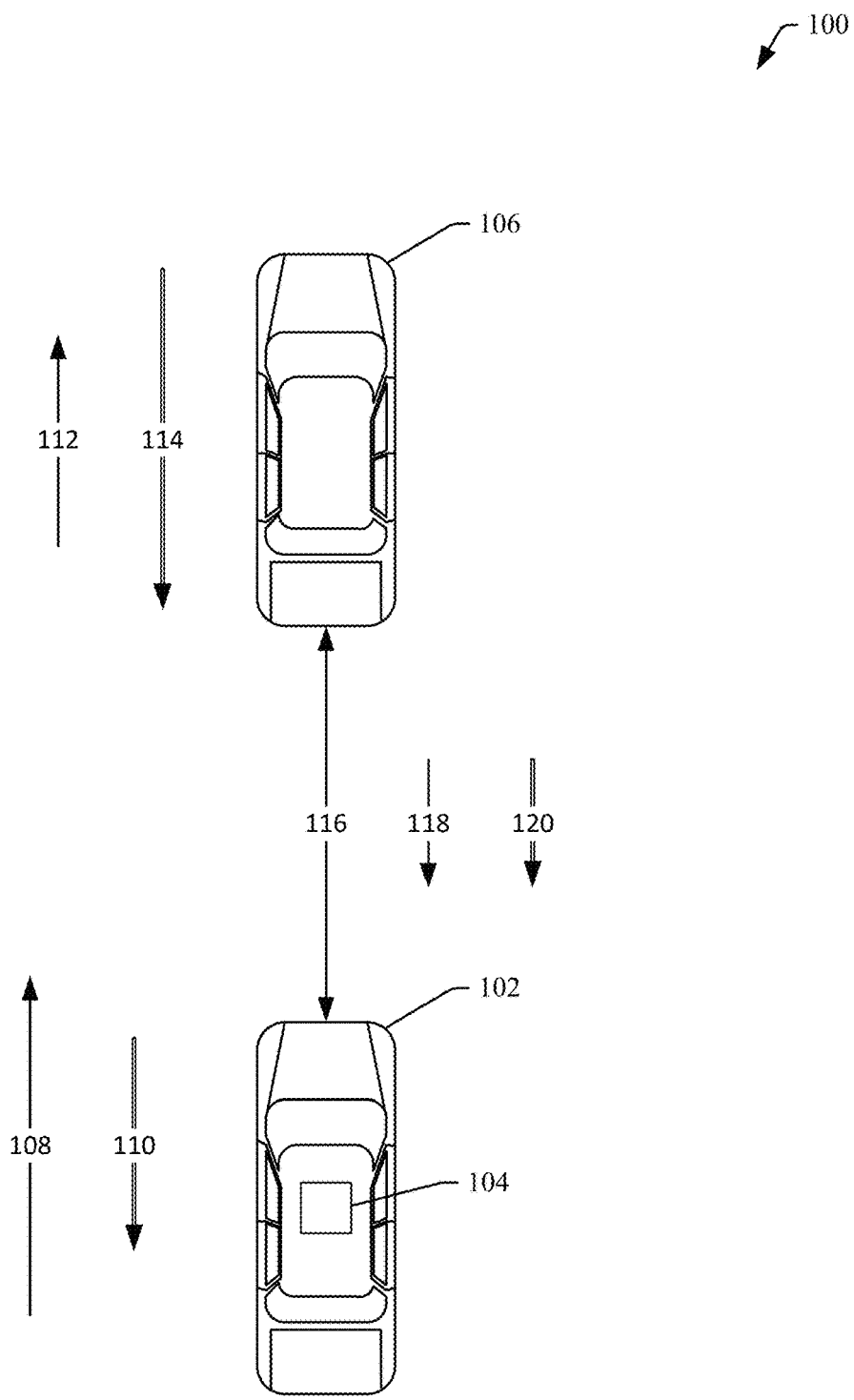
FIG. 1 illustrates an example environment where AEB using a TTC threshold based on target acceleration may be used.

FIG. 1 is an example environment 100 where AEB using a time-to-collision threshold based on target acceleration may be used. The environment contains a vehicle 102 (e.g., host vehicle) that includes an AEB system 104, which is discussed further in regard to FIG. 2, and a target 106 (e.g., target object or target vehicle) that is in a path of travel of the vehicle 102. Although shown as automobiles, the vehicle 102 may be any type of system with autonomous braking ability (car, truck, motorcycle, e-bike, boat, etc.), and the target 106 may be any type of moving object (another car, truck, motorcycle, e-bike, or boat, pedestrian, cyclist, boulder, etc.).

In the illustrated example, the vehicle 102 is traveling with a vehicle velocity 108 and accelerating with a vehicle acceleration 110. The target 106 is traveling with a target velocity 112 and accelerating with a target acceleration 114. A distance 116 exists between the vehicle 102 and the target 106. A relative velocity 118 exists that is based on a difference between the target velocity 112 and the vehicle velocity 108, and a relative acceleration 120 exists that is based on a difference between the target acceleration 114 and the vehicle acceleration 110.

In the illustrated example, a positive velocity has a direction of up the page, and a negative velocity has a direction down the page. The vehicle velocity 108 is positive (because it gives a reference direction), and the target velocity 112 can be either positive or negative depending on whether it is traveling in the same direction as the vehicle 102. As such, the relative velocity 118 is negative when the target 106 has a lower speed than the vehicle 102 or is traveling in the opposite direction (e.g., is headed towards the vehicle 102).

Similarly, a positive acceleration has a direction of up the page, and a negative acceleration has a direction of down the page. The accelerations are positive when the respective entities are accelerating in the direction of the vehicle velocity 108 and negative when the respective entities are decelerating in the direction of the vehicle velocity 108.

The magnitudes of the respective vectors are shown for illustration purposes only. For example, in the illustrated example, the target acceleration 114 is less than the vehicle acceleration 110 (e.g., the target 106 is decelerating faster than the vehicle 102). Furthermore, the conventions used may differ without departing from the scope of the disclosure.

Based on the above, the vehicle 102 is traveling faster than the target 106 and in a same direction. Also, the target 106 is decelerating more aggressively than the vehicle 102. The example illustration may be indicative of a panic stop by the target 106, e.g., to avoid its own collision.

By utilizing the techniques described herein, the vehicle 102 is able to determine a more accurate TTC threshold for the example environment 100. In doing so, the vehicle 102 may be able to avoid colliding with the target 106, which may not be possible with traditional AEB systems.

Example System

Figure 2:
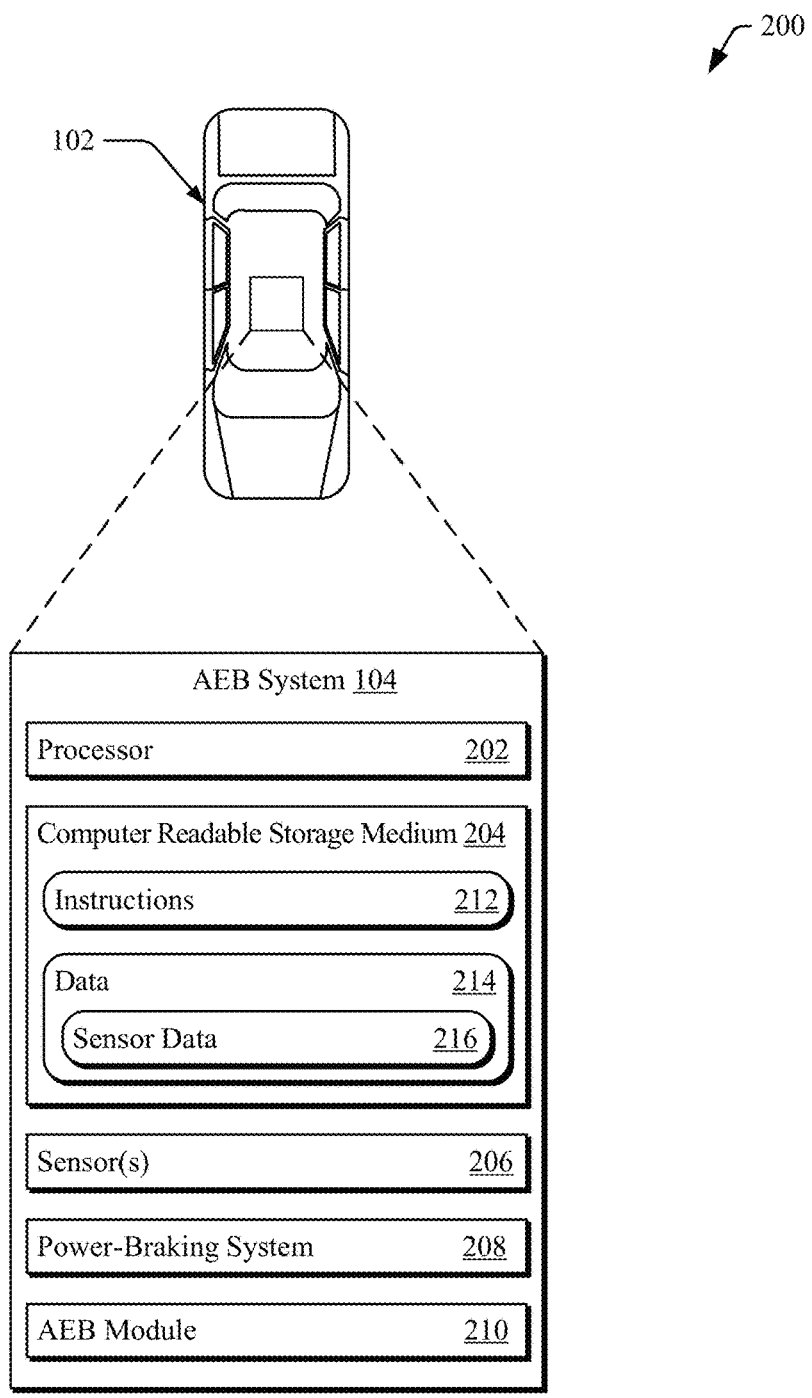
FIG. 2 illustrates an example AEB system configured to perform AEB using a TTC threshold based on target acceleration.

FIG. 2 is an example illustration 200 of the AEB system 104 in which AEB using a time-to-collision threshold based on target acceleration can be implemented. As shown underneath, the AEB system 104 of the vehicle 102 includes at least one processor 202, at least one computer-readable storage medium 204, one or more sensors 206, a power-braking system 208, and an AEB module 210.

The processor 202 (e.g., an application processor, microprocessor, digital-signal processor (DSP), or controller) executes instructions 212 (e.g., code) stored within the computer-readable storage medium 204 (e.g., a non-transitory storage devices such as a hard drive, SSD, flash memory, read-only memory (ROM), EPROM, or EEPROM) to cause the AEB system 104 to perform the techniques described herein. The instructions 212 may be part of an operating system and/or one or more applications of the AEB system 104.

The instructions 212 cause the AEB system 104 to act upon (e.g., create, receive, modify, delete, transmit, or display) data 214 (e.g., application data, module data, sensor data 216 from sensors 206, or I/O data). Although shown as being within the computer-readable storage medium 204, portions of the data 214 may be within a random-access memory (RAM) or a cache of the AEB system 104 (not shown). Furthermore, the instructions 212 and/or the data 214 may be remote to the AEB system 104.

The AEB module 210 (or portions thereof) may be comprised by the computer-readable storage medium 204 or be a stand-alone component (e.g., executed in dedicated hardware in communication with the processor 202 and computer-readable storage medium 204). For example, the instructions 212 may cause the processor 202 to implement or otherwise cause the AEB module 210 to receive the sensor data 216 and implement AEB, as described below.

The sensors 206 provide the sensor data 216 that enables the determination of the attributes described in FIG. 1 (e.g., distance 116, vehicle velocity 108, vehicle acceleration 110, target velocity 112, target acceleration 114, relative velocity 118, and relative acceleration 120). For example, the sensors 206 may comprise a ranging sensor to indicate the distance 116, the target velocity 112, and the target acceleration 114. A speedometer may be implemented to indicate the vehicle velocity 108, and an accelerometer may be implemented to indicate the vehicle acceleration 110.

In some implementations, the sensors 206 may comprise instructions that interface with another module or system of the vehicle 102 to determine the attributes described in FIG. 1. For example, the sensors 206 may comprise instructions to receive the vehicle acceleration 110 from an airbag module or vehicle dynamics module that contains an accelerometer.

Furthermore, in some implementations, the sensors 206 may comprise instructions to receive information from the target 106 via a communication system (not shown). For example, a vehicle-to-vehicle communication system may be used to obtain the target velocity 112 and the target acceleration 114.

The power-braking system 208 may be any type of system known by those of ordinary skill in the art. For example, the power-braking system may be a hydraulic, pneumatic, or electric braking system or some combination thereof. Regardless of implementation, the power-braking system 208 provides braking forces to the vehicle that are effective to slow the vehicle 102.

By determining the TTC threshold for the target 106 using the techniques described herein, the power-braking system 208 may apply the braking forces earlier than traditional AEB systems. In doing so, the AEB system 104 is able to mitigate front-end collisions with better efficacy.

Example Data Flow

Figure 3:
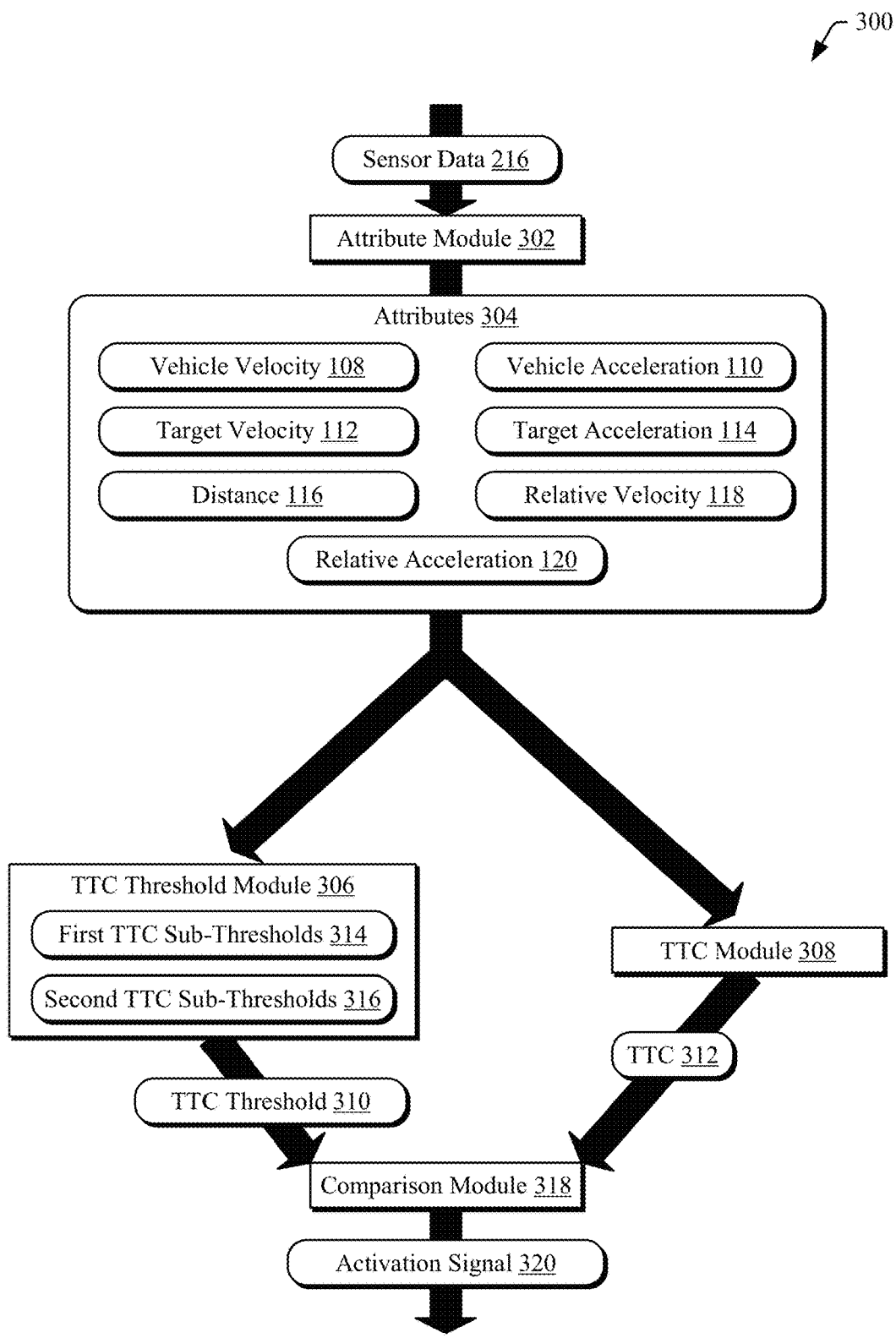
FIG. 3 illustrates an example data flow and actions for AEB using a TTC threshold based on target acceleration.

FIG. 3 is an example illustration 300 of a data flow and actions for AEB using a TTC threshold based on target acceleration. The example illustration 300 is generally comprised by the AEB module 210. Various other entities, however, may perform one or more of the actions described below.

The example illustration 300 starts with the sensor data 216 being received at an input to an attribute module 302 of the AEB module 210. The attribute module 302 uses the sensor data 216 to determine attributes 304 of the vehicle 102 and the target 106, including those discussed in regard to FIG. 1. For example, the attributes 304 may comprise the vehicle velocity 108, the vehicle acceleration 110, the target velocity 112, the target acceleration 114, the distance 116, the relative velocity 118, and the relative acceleration 120. Some of the attributes 304 may be directly determined from the sensor data 216 (e.g., the vehicle velocity 108 determined from a speedometer output), and some of the attributes 304 may be derived from the sensor data 216 (e.g., the relative velocity 118 determined from a speedometer output and a ranging sensor output). Regardless of how the attributes 304 are determined, derived, or calculated, the attribute module 302 is configured to output the attributes 304 to a TTC threshold module 306 and a TTC module 308 of the AEB module 210.

The TTC threshold module 306 and the TTC module 308 receive the attributes 304 as inputs, or otherwise have access to a shared memory that stores the attributes 304. For example, the attribute module 302 may allocate a shared memory space as registers for containing the attributes 304, e.g., within computer readable storage medium 204. The TTC threshold module 306 and/or the TTC module 308 can access the registers in order to determine a TTC threshold 310 and/or a TTC 312 for the target 106.

The TTC threshold module 306 may use the vehicle velocity 108, the relative velocity 118, the target acceleration 114, and the distance 116 to determine the TTC threshold 310 for the target 106. The TTC module 308 may use the relative acceleration 120, the relative velocity 118, and the distance 116 to determine the TTC 312 for the target 106. The TTC 312 is an estimated time-to-collision with the target 106, and the TTC threshold 310 is a threshold for the target 106 that is used to activate AEB once the TTC 312 crosses the determined TTC threshold 310.

The TTC module 308 calculates the TTC 312 for the target 106 by solving the quadratic equation of Equation 1 for t (TTC 312):

$$\tfrac{1}{2}a_r t^2 + v_r t + s = 0 \qquad (1)$$

where $a_r$ is the relative acceleration 120, $v_r$ is the relative velocity 118, and s is the distance 116. The TTC module 308 outputs the TTC 312 to a comparison module 318.

The TTC threshold module 306 determines the TTC threshold 310 for the target 106 based on a sum of a one of first TTC sub-thresholds 314 and a one of second TTC sub-thresholds 316. By using two sub-thresholds, the TTC threshold module 306 is able to factor the target acceleration 114 into the determination of the TTC threshold 310. The TTC threshold 310 determination is discussed below in regard to FIG. 4. The TTC threshold module 306 outputs the TTC threshold 310 to the comparison module 318.

The TTC threshold 310 and the TTC 312 for the target 106 are received by the comparison module 318 of the AEB module 210, which determines if the TTC 312 has met or is lower than the TTC threshold 310. The TTC threshold 310 and the TTC 312 may be constantly or intermittently calculated and updated for receipt by the comparison module 318. As such, the comparison module 318 may evaluate the TTC threshold 310 against the TTC 312 constantly or intermittently, as well. If or when the TTC 312 for the target 106 has met or is lower than the TTC threshold 310 for the target 106, the comparison module 318 sends an activation signal 320 to the power-braking system 208 to apply a braking force to stop the vehicle 102.

By utilizing the target acceleration 114 for the TTC threshold 310 determination for the target 106, the AEB module 210 is able to compensate for situations where the target 106 is decelerating aggressively. In this way, the AEB module 210 is able to cause the vehicle 102 to avoid collisions more effectively than traditional AEB systems.

TTC Threshold Determination

FIG. 4 is an example illustration 400 of look-up tables that may be used to determine the TTC threshold 310 for the target 106. As stated above, the TTC threshold 310 for the target 106 may be a sum of a determined one of first TTC sub-thresholds 314 and a determined one of second TTC sub-thresholds 316. The one of the TTC sub-thresholds 314 is selected based on the vehicle velocity 108 and the relative velocity 118. The one of the second TTC sub-thresholds 316 is selected based on the target acceleration 114 and the distance 116. By basing the TTC threshold 310 on the sum of the first and second TTC sub-thresholds 314, 316, proportionate weighting may be given to the target acceleration 114 and the distance 116 relative to the vehicle velocity 108 and the relative velocity 118.

As illustrated, the first TTC sub-thresholds 314 and the second TTC sub-thresholds 316 are organized into respective two-dimensional look-up tables. Accordingly, the one of the first TTC sub-thresholds 314 for the target 106 is at an intersection of the vehicle velocity 108 and the relative velocity 118. Similarly, the one of the second TTC sub-thresholds 316 for the target 106 is at an intersection of the target acceleration 114 and the distance 116.

Consider an example where the vehicle velocity 108 is c, the relative velocity 118 is 1, the target acceleration 114 is h, and the distance 116 is 7. By using the illustrated look-up tables, the first TTC sub-threshold for the target 106 would be c1 (e.g., first TTC sub-threshold 402), and the second TTC sub-threshold for the target 106 would be h7 (e.g., second TTC sub-threshold 404). Accordingly, the TTC threshold 310 for the target 106 would be a sum of the first TTC sub-threshold 402 and the second TTC sub-threshold 404 (e.g., c1+h7).

The first TTC sub-thresholds 314 (e.g., values within the upper look-up table) are pre-determined based on Equation 2:

$$\frac{d_{ideal}}{|v_r|} \qquad (2)$$

where $d_{ideal}$ is an ideal braking distance based on an ideal braking profile of the vehicle 102.

The ideal braking distance is calculated based on Equation 3:

$$d_{safe} + v_h t_{delay} + \int\!\!\int_0^{t_{req}} a(t) d^2 t \qquad (3)$$

where $d_{safe}$ is a desired minimum safe distance between the vehicle 102 and the target 106 after stopping, $t_{delay}$ is a delay between the AEB system 104 activating and the power-braking system 208 applying braking forces, and a(t) is a time-based ideal braking profile with maximum acceleration of the vehicle achieved by the AEB system 104 (either single or multiple stage), and $t_{req}$ is a required time to brake the vehicle 102 from the relative velocity 118 to zero.

The $t_{req}$ is based on solving Equation 4 for $t_{req}$:

$$v_r = \int_0^{t_{req}} a(t) dt \qquad (4)$$

The first TTC sub-thresholds 314 may be adjusted based on empirical data for the vehicle 102, another vehicle, or many vehicles. For example, the above equations may be used to provide baseline values, and the empirical data may be used to "tune" the first TTC sub-thresholds 314. For example, initial values may be established based on the above equations. Actual braking performance for each of the input pairs (vehicle velocity/relative velocity pairs) may be determined, and any differences may be used to adjust the values.

The second TTC sub-thresholds 316 (e.g., values within the lower look-up table) may be pre-determined based on empirical data for the vehicle 102, another vehicle, or for many vehicles. For example, test scenarios may be set up for each of the input pairs (target acceleration/distance pairs) and used to determine values that produce the desired braking. Real-world or simulated data associated with each of the test scenarios may be fed into a machine learning model to determine the second TTC sub-thresholds 316.

In some implementations, modeling equations known by those of ordinary skill in the art may be used instead of, or in conjunction with, the empirical data to determine the values. Although described in terms of target acceleration/distance inputs, the second TTC sub-thresholds 316 may be based on other attributes.

Although the example illustration 400 shows a sum of values from two two-dimensional look-up tables, a single four-dimensional look-up table may be used with vehicle velocity, relative velocity, target acceleration, and distance as the respective dimensions. The TTC threshold 310, in such a case, would become a value within the four-dimensional look-up table that corresponds to the vehicle velocity 108, the relative velocity 118, the target acceleration 114, and the distance 116.

The look-up tables (e.g., the first TTC sub-thresholds 314 and the second TTC sub-thresholds 316) may be stored within the computer-readable storage medium 204, e.g., as data 212. By doing so, the TTC threshold module 306 may determine the first TTC sub-threshold 402 and the second TTC sub-threshold 404 for the target 106 quickly without having to solve the equations above. It should be noted, however, that one or more of the look-up tables may not be used in some implementations. For example, one or more of the first TTC sub-threshold 314 and the second TTC sub-threshold 316 for the target 106 may be calculated in real-time by the TTC threshold module 306 using the above equations and techniques.

Example Method

Figure 5:
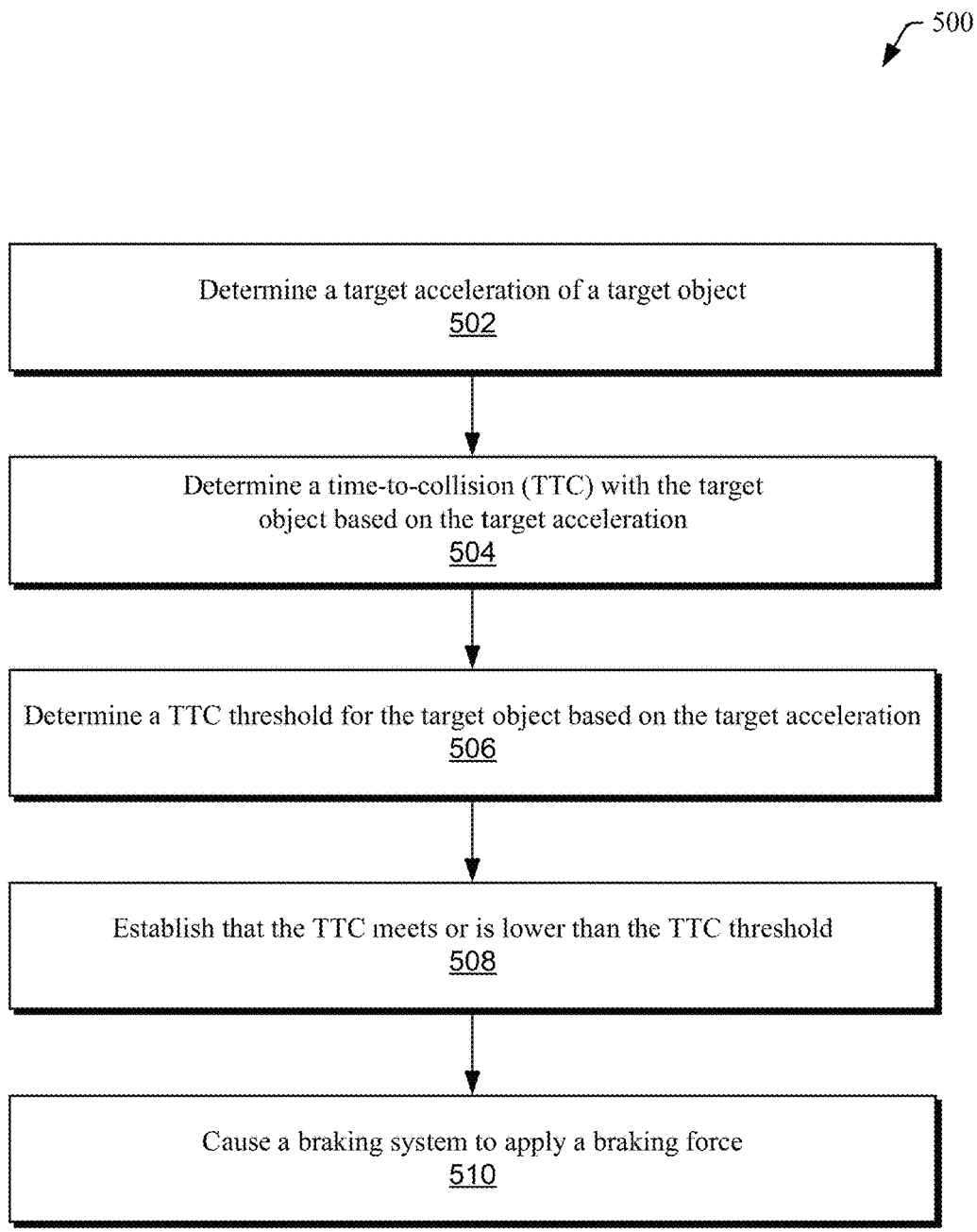
FIG. 5 illustrates an example method of AEB using a TTC threshold based on target acceleration.

FIG. 5 illustrates an example method 500 for AEB using a TTC threshold based on target acceleration. Method 500 may be implemented utilizing the previously described examples, such as the environment 100, the AEB system 104, the process flow of illustration 300, and determination of the TTC threshold 310 of illustration 400. Operations 502 through 510 may be performed by one or more entities of a vehicle (e.g., portions of the AEB system 104). The order in which the operations are shown and/or described is not intended to be construed as a limitation, and any number or combination of the operations can be combined in any order to implement the method 500 or an alternate method.

At 502, a target acceleration of a target object proximate to a vehicle is determined based on sensor data received from one or more sensors that are local to the vehicle. For example, the attribute module 302 may receive the sensor data 216 and determine the target acceleration 114. Other attributes 304 may also be determined by the attribute module 302, such as the vehicle velocity 108, the vehicle acceleration 110, the target velocity 112, the distance 116, the relative velocity 118, and the relative acceleration 120. Using the example of FIG. 1, the vehicle 102 may be approaching the target 106 that is decelerating aggressively.

At 504, a TTC is determined for the target object based on the target acceleration 114. For example, the TTC module 308 may receive the relative acceleration 120 (which is based on the target acceleration 114) from the attribute module 302 and determine the TTC 312. The TTC 312 may further be based on the relative velocity 118 and the distance 116. Continuing with the example of FIG. 1, consider that the TTC 312 is determined to be 2 seconds.

At 506, a TTC threshold is determined for the target object based on the target acceleration 114. For example, the TTC threshold module 306 may receive the target acceleration 114 and determine the first TTC sub-threshold 402 for the target 106 and the second TTC sub-threshold 404 for the target 106. The first TTC sub-threshold 402 may be based on the vehicle velocity 108 and the relative velocity 118. The second TTC sub-threshold 404 may be based on the target acceleration 114 and the distance 116. The first and second TTC sub-thresholds 402, 404 may be added by the TTC threshold module 306 to determine the TTC threshold 310. Continuing with the example of FIG. 1, consider that the first TTC sub-threshold 402 is determined to be 1.8 seconds and that the second TTC sub-threshold 404 is determined to be 0.3 seconds.

At 508, an establishment is made that the TTC meets or is lower than the TTC threshold. For example, the comparison module 318 may receive the TTC threshold 310 and the TTC 312 and determine if the TTC 312 is less than or equal to the TTC threshold 310.

Consider again the example of FIG. 1. Without utilizing the second TTC sub-threshold 404, the comparison module 318 would receive the first TTC sub-threshold 402 as the TTC threshold 310. As such, the comparison module 318 would fail to provide an activation signal 320 because 1.8 seconds is less than 2 seconds. However, by incorporating the second TTC sub-threshold 402, the TTC threshold 310 becomes 1.1 seconds (0.8+0.3). As such, the comparison module 318 does provide the activation signal 320.

At 510, a braking system is caused to apply a braking force. For example, the comparison module 318 may provide the activation signal 320 to the power-braking system 208 that is effective to slow the vehicle to avoid the target 106. By activating the braking system 208 based on a combination of the first and second TTC sub-thresholds, the AEB module 210 is able to mitigate a collision that may not have been mitigated by conventional AEB systems.

Examples

Example 1: A method of automatic emergency braking (AEB) performed by a vehicle, the method comprising: determining, based on sensor data received from one or more sensors that are local to the vehicle, a target acceleration of a target object proximate to the vehicle; determining, based on the target acceleration, a time to collision (TTC) with the target object; determining, based on the target acceleration, a TTC threshold for the target object; establishing that the TTC meets or is lower than the TTC threshold; and causing, based on the establishing that the TTC has met or is lower than the TTC threshold, a braking system of the vehicle to apply a braking force effective to avoid a collision with the target object.

Example 2: The method as recited in example 1, further comprising: determining, based on the sensor data, a relative acceleration, a relative velocity, and a distance between the target object and the vehicle, wherein the TTC is based further on the relative acceleration, the relative velocity, and the distance.

Example 3: The method as recited in example 2, wherein the determining the TTC comprises solving a quadratic equation.

Example 4: The method as recited in example 1, further comprising: determining, based on the sensor data, a vehicle velocity of the vehicle, a relative velocity between the target object and the vehicle, and a distance between the target object and the vehicle, wherein the TTC threshold is based further on the vehicle velocity, the relative velocity, the target acceleration, and the distance.

Example 5: The method as recited in example 4, wherein the TTC threshold is further based on one or more values within one or more sets of values.

Example 6: The method as recited in example 5, wherein: the sets of values comprise first and second sets of values; and the TTC threshold is a sum of a first TTC sub-threshold determined from the first set of values and a second TTC sub-threshold determined from the second set of values.

Example 7: The method as recited in example 6, wherein the first and second sets of values comprise first and second two-dimensional look-up tables.

Example 8: The method as recited in example 7, wherein: the vehicle velocity and the relative velocity correspond to respective dimensions of the first two-dimensional look-up table; and the target acceleration and the distance correspond to respective dimensions of the first two-dimensional look-up table the second two-dimensional look-up table.

Example 9: The method as recited in example 8, wherein the first sets of values within the first two-dimensional look-up table are based on an ideal braking profile of the vehicle.

Example 10: The method as recited in example 8, wherein the second sets of values within the second two-dimensional look-up table are based on empirical data.

Example 11: A system for automatic emergency braking (AEB) of a vehicle, the system comprising: one or more sensors configured to produce sensor data indicating attributes of the vehicle and a target object proximate to the vehicle; a braking system configured to apply braking forces effective to slow the vehicle in conjunction with or in lieu of driver input; at least one processor; and at least one computer-readable storage medium comprising instructions that, when executed by the processor, cause the system to: determine, based on the sensor data, a target acceleration of the target object; determine, based on the target acceleration, a time to collision (TTC) with the target object; determine, based on the target acceleration, a TTC threshold for the target object; establish that the TTC meets or is lower than the TTC threshold; and cause, based on the establishment that the TTC has met or is lower than the TTC threshold, the braking system to apply a braking force effective to avoid a collision with the target object.

Example 12: The system as recited in example 11, wherein the instructions further cause the processor to: determine, based on the sensor data, a relative acceleration, a relative velocity, and a distance between the target object and the vehicle, wherein the TTC is based further on the relative acceleration, the relative velocity, and the distance.

Example 13: The system as recited in example 12, wherein the determination of the TTC comprises solving a quadratic equation.

Example 14: The system as recited in example 12, wherein the instructions further cause the processor to: determine, based on the sensor data, a vehicle velocity of the vehicle, a relative velocity between the target object and the vehicle, and a distance between the target object and the vehicle, wherein the TTC threshold is based further on the vehicle velocity, the relative velocity, the target acceleration, and the distance.

Example 15: The system as recited in example 14, wherein the TTC threshold is further based on one or more values within one or more sets of values stored within the computer-readable storage medium.

Example 16: The system as recited in example 15, wherein: the sets of values comprise first and second sets of values; and the TTC threshold is a sum of a first TTC sub-threshold determined from the first set of values and a second TTC sub-threshold determined from the second set of values.

Example 17: The system as recited in example 16, wherein the first and second sets of values comprise first and second two-dimensional look-up tables.

Example 18: The system as recited in example 17, wherein: the vehicle velocity and the relative velocity correspond to respective dimensions of the first two-dimensional look-up table; and the target acceleration and the distance correspond to respective dimensions of the first two-dimensional look-up table the second two-dimensional look-up table.

Example 19: The system as recited in example 18, wherein the first sets of values within the first two-dimensional look-up table are based on an ideal braking profile of the vehicle.

Example 20: The system as recited in example 18, wherein the second sets of values within the second two-dimensional look-up table are based on empirical data.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method of automatic emergency braking (AEB) performed by a vehicle, the method comprising:
    determining, at a time and based on sensor data received from one or more sensors that are local to the vehicle, a target velocity and a target acceleration of a target object proximate to the vehicle, a vehicle velocity and a vehicle acceleration of the vehicle, and a distance between the target object and the vehicle;
    determining, for the time and based on the target velocity and the vehicle velocity at the time, a relative velocity;
    determining, for the time and based on the target acceleration and the vehicle acceleration at the time, a relative acceleration;
    determining, for the time and based on the distance, the relative velocity, and the relative acceleration, a time to collision (TTC) with the target object;
    calculating, for the time, a TTC threshold for the target object, the TTC threshold corresponding to a time needed by the vehicle to slow to avoid a collision with the target object, the TTC threshold comprising a sum of a first time corresponding to a function of the relative velocity and the vehicle velocity and a second time corresponding to a function of the target acceleration and the distance;
    establishing that the TTC for the time meets or is lower than the TTC threshold calculated for the time; and
    causing, based on the establishing that the TTC has met or is lower than the TTC threshold, a braking system of the vehicle to apply a braking force effective to avoid a collision with the target object.

2. The method as recited in claim 1, wherein the determining the TTC comprises solving a quadratic equation.

3. The method as recited in claim 1, wherein the first time is based on an ideal braking profile of the vehicle.

4. The method as recited in claim 3, wherein the ideal braking profile of the vehicle is a maximum braking profile of the vehicle.

5. The method as recited in claim 1, wherein the second time is based on empirical data.

6. The method as recited in claim 1, wherein the braking force effective to avoid the collision with the target object comprises a maximum amount of braking available to the braking system.

7. The method as recited in claim 1, wherein the function of the relative velocity and the vehicle velocity comprises a two-dimensional look up table.

8. The method as recited in claim 1, wherein the function of the target acceleration and the distance comprises a two-dimensional look up table.

9. A system for automatic emergency braking (AEB) of a vehicle, the system comprising:
   one or more sensors configured to produce sensor data indicating attributes of the vehicle and a target object proximate to the vehicle;
   a braking system configured to apply braking forces effective to slow the vehicle in conjunction with or in lieu of driver input;
   at least one processor; and
   at least one computer-readable storage medium comprising instructions that, when executed by the processor, cause the system to:
     determine, at a time and based on the sensor data, a target velocity and a target acceleration of the target object, a vehicle velocity and a vehicle acceleration of the vehicle, and a distance between the target object and the vehicle;
     determine, for the time and based on the target velocity and the vehicle velocity at the time, a relative velocity;
     determine, for the time and based on the target acceleration and the vehicle acceleration at the time, a relative acceleration;
     determine, for the time and based on the distance, the relative velocity, and the relative acceleration, a time to collision (TTC) with the target object;
     calculate, for the time, a TTC threshold for the target object, the TTC threshold corresponding to a time needed by the vehicle to slow to avoid a collision with the target object, the TTC threshold comprising a sum of a first time corresponding to a function of the relative velocity and the vehicle velocity and a second time corresponding to a function of the target acceleration and the distance;
     establish that the TTC for the time meets or is lower than the TTC threshold calculated for the time; and
     cause, based on the establishment that the TTC has met or is lower than the TTC threshold, the braking system to apply a braking force effective to avoid a collision with the target object.

10. The system as recited in claim 9, wherein the determination of the TTC comprises solving a quadratic equation.

11. The system as recited in claim 9, wherein the first time is based on an ideal braking profile of the vehicle.

12. The system as recited in claim 11, wherein the ideal braking profile of the vehicle is a maximum braking profile of the vehicle.

13. The system as recited in claim 9, wherein the second time is based on empirical data.

14. The system as recited in claim 9, wherein the braking force effective to avoid the collision with the target object comprises a maximum amount of braking available to the braking system.

15. The system as recited in claim 9, wherein the function of the relative velocity and the vehicle velocity comprises a two-dimensional look up table.

16. The system as recited in claim 9, wherein the function of the target acceleration and the distance comprises a two-dimensional look up table.

17. At least one non-transitory computer-readable storage medium comprising instructions that, when executed, cause at least one processor to:
   determine, at a time and based on sensor data, a target velocity and a target acceleration of a target object, a vehicle velocity and a vehicle acceleration of a host vehicle, and a distance between the target object and the host vehicle;
   determine, for the time and based on the target velocity and the vehicle velocity at the time, a relative velocity;
   determine, for the time and based on the target acceleration and the vehicle acceleration at the time, a relative acceleration;
   determine, for the time and based on the distance, the relative velocity, and the relative acceleration, a time to collision (TTC) with the target object;
   calculate, for the time, a TTC threshold for the target object, the TTC threshold corresponding to a time needed by the host vehicle to slow to avoid a collision with the target object, the TTC threshold comprising a sum of a first time corresponding to a function of the relative velocity and the vehicle velocity and a second time corresponding to a function of the target acceleration and the distance;
   establish that the TTC for the time meets or is lower than the TTC threshold calculated for the time; and
   cause, based on the establishment that the TTC has met or is lower than the TTC threshold, a braking system of the host vehicle to apply a braking force effective to avoid a collision with the target object.

18. The non-transitory computer-readable storage medium as recited in claim 17, wherein the first time is based on an ideal braking profile of the vehicle.

19. The non-transitory computer-readable storage medium as recited in claim 17, wherein the second time is based on empirical data.

20. The non-transitory computer-readable storage medium as recited in claim 17, wherein the braking force effective to avoid the collision with the target object comprises a maximum amount of braking available to the braking system.

* * * * *